US010356340B2

(12) United States Patent
Nussbaum et al.

(10) Patent No.: US 10,356,340 B2
(45) Date of Patent: Jul. 16, 2019

(54) VIDEO RENDERING WITH TELEPROMPTER OVERLAY (71) Applicant: RECRUIT MEDIA, INC., New York, NY (US)

(72) Inventors: Jeffrey Nussbaum, New York, NY (US); Ira Bell, St. Petersburg, FL (US)

(73) Assignee: RECRUIT MEDIA, INC., New York, NY (US)

(*) Notice: Subject to any disclaimer, the term of this patent is extended or adjusted under 35 U.S.C. 154(b) by 0 days.

(21) Appl. No.: 15/693,972

(22) Filed: Sep. 1, 2017

(65) Prior Publication Data

US 2018/0070026 A1  Mar. 8, 2018

Related U.S. Application Data (60) Provisional application No. 62/383,174, filed on Sep. 2, 2016.

(51) Int. Cl.
| | |
|---|---|
| *H04N 5/272* | (2006.01) |
| *H04N 5/232* | (2006.01) |
| *H04N 5/77* | (2006.01) |
| *H04N 5/222* | (2006.01) |
| *G11B 27/11* | (2006.01) |
| *G11B 27/34* | (2006.01) |
| *G06F 3/03* | (2006.01) |
| *G06F 3/0481* | (2013.01) |
| *G06F 3/0484* | (2013.01) |

(52) U.S. Cl.
CPC ........... *H04N 5/272* (2013.01); *G06F 3/0304* (2013.01); *G06F 3/0481* (2013.01); *G11B 27/11* (2013.01); *G11B 27/34* (2013.01); *H04N 5/2222* (2013.01); *H04N 5/23293* (2013.01); *H04N 5/77* (2013.01); *G06F 3/04847* (2013.01)

(58) Field of Classification Search
USPC .......................................... 386/201, 348, 278
See application file for complete search history.

(56) References Cited

U.S. PATENT DOCUMENTS

| | | | |
|---|---|---|---|
| 6,704,034 B1* | 3/2004 | Rodriguez | .................... 715/764 |
| 8,019,271 B1* | 9/2011 | Izdepski | ................ H04H 60/73 455/3.01 |
| 2007/0260677 A1 | 11/2007 | DeMarco et al. | |

(Continued)

OTHER PUBLICATIONS

"Video Teleprompter for iOS" www.videoteleprompter.com, accessed in Apr. 2016, 5 pages.

*Primary Examiner* — Nigar Chowdhury
(74) *Attorney, Agent, or Firm* — Lowenstein Sandler LLP (57) ABSTRACT

Systems and methods for rendering video with teleprompter script overlays are described. A video rendering system provides a user interface for displaying a script for use during the rendering of the video (e.g., while the user records and/or streams the video). The script is arranged such that it at least partially overlays the video feed and is positioned within the display of the user interface to produce a line of sight of a user corresponding to first region of a field of view of the video capture device. When a user's line of sight is fixed upon the script overlay (i.e., when the user is reading the script) and aligned with the first region of the field of view of the video capture device, a viewer of the video rendering is given a visual perception that the user is looking directly at the viewer (e.g., making eye contact).

14 Claims, 6 Drawing Sheets

(56) References Cited

U.S. PATENT DOCUMENTS

| | | | |
|---|---|---|---|
| 2008/0273796 A1* | 11/2008 | Kansal | G06K 9/325 |
| | | | 382/176 |
| 2010/0253766 A1* | 10/2010 | Mann | G06F 3/011 |
| | | | 348/51 |
| 2010/0293465 A1* | 11/2010 | Kleinschmidt | G11B 27/034 |
| | | | 715/719 |
| 2011/0106624 A1 | 5/2011 | Bonner et al. | |
| 2011/0149138 A1* | 6/2011 | Watkins | G06F 3/0485 |
| | | | 348/333.02 |
| 2012/0017236 A1* | 1/2012 | Stafford | A63F 13/00 |
| | | | 725/32 |
| 2012/0302167 A1* | 11/2012 | Yun | G06F 3/04883 |
| | | | 455/41.2 |
| 2013/0231157 A1* | 9/2013 | Chung | H04M 1/0264 |
| | | | 455/556.1 |
| 2015/0138220 A1* | 5/2015 | Chapman | G06T 11/60 |
| | | | 345/589 |
| 2015/0278867 A1 | 10/2015 | Lerman et al. | |
| 2016/0048313 A1* | 2/2016 | Weil | H04M 1/72547 |
| | | | 715/723 |
| 2016/0162966 A1* | 6/2016 | Naficy | G06Q 30/0621 |
| | | | 705/26.5 |
| 2016/0191958 A1* | 6/2016 | Nauseef | H04N 21/23418 |
| | | | 725/116 |
| 2017/0364939 A1* | 12/2017 | Abou Mahmoud | |
| | | | G06Q 30/0231 |
| 2018/0035162 A1* | 2/2018 | Verrilli | G06F 17/271 |

* cited by examiner

VIDEO RENDERING WITH TELEPROMPTER OVERLAY

CROSS-REFERENCE TO RELATED APPLICATION

This application claims the benefit of U.S. Provisional Patent Application No. 62/383,174, filed Sep. 2, 2016, titled "Displaying and Recording Live Video Feed with Teleprompter Overlay", the entirety of which is hereby incorporated by reference herein.

TECHNICAL FIELD

The present disclosure relates generally to systems and method for the use of teleprompter script overlays in the recording of video.

BACKGROUND

In many instances, a user of a computing device (e.g., a mobile device) may wish to generate and video for streaming and/or recording using a camera associated with the computing device. For example, in the hiring, employment, or recruiting industries, a user (e.g., a job candidate) may wish to stream and/or record a video of the user including dialogue, such as, content relating to an interview or job application. In such cases, the user may wish to read from a script including content prepared in anticipation of the interview or other video-based interaction. However, a user reading from a script that is positioned or located next to the recording device (e.g., the camera) fails to establish and maintain a line of sight with the recording device. Accordingly, the resulting recorded or streamed video includes a subject that is not making "eye contact" with a viewer of video, since the subject is forced to continually look away from the primary line of sight of the camera to refer to his or her notes. This results in a distracting and low quality viewing experience for a viewer of the video.

In addition, the user engaged in a streaming video conference or preparing a recorded video for later consumption by a viewer may not have experience or knowledge relating to the substance of the dialogue. In such cases, the user may lack the ability to adequately prepare notes, talking points, or a script for reference during the video presentation.

DETAILED DESCRIPTION

This disclosure relates to methods and systems for rendering video with teleprompter script overlays. In one embodiment, a video rendering system is described to provide a user interface for displaying text-based content (herein a "script") to a user for use during the rendering of the video (e.g., while the user records and/or streams the video). As described herein, the rendering of a video includes the production of image data using one or more image capture devices (e.g., a camera). In one embodiment, rendering the video includes streaming or transmitting the video from one computing device to another computing device. In one embodiment, the rendering of the video includes recording the video and storing the recording in a data store (e.g., a database). In one embodiment, rendering the video includes recording and streaming/transmitting a video.

In one embodiment, a display is generated via a user interface of a computing device. The display includes a video feed including video data captured using a video capture device and a script overlay including text of a script. The script overlay is arranged such that it at least partially overlays the video feed and is positioned within the display of the user interface to produce a line of sight of a user corresponding to first region of a field of view of the video capture device. In one embodiment, when a user's line of sight is fixed upon the script overlay and aligned with the first region of the field of view of the video capture device, a viewer of the video rendering is given a visual perception that the user is looking directly at the viewer (e.g., making eye contact). In one embodiment, the line of sight of the user that is created by reading the text of the script overlay corresponds to the first region of the field of view of the video capture device in such a manner that a resulting video rendering (e.g., a streamed video or a recorded video) provides the visual perception that the user is looking directly into the camera (or at a viewer of the video rendering). In one embodiment, the script overlay is arranged at a position of the display to produce a line of sight of a user corresponding to the first region (e.g., a region corresponding to "eye contact" with a viewer of the rendered video) of a field of view of the video capture device.

In one embodiment, the video rendering system may overlay the script on a display visible to the user in connection with the rendering of a video of a live video feed (e.g., a video feed or video stream) and/or a video recording (e.g., video data stored in a data store). Accordingly, a user may read the script while maintaining a direct line of sight with the display and viewing the rendered video. In one embodiment, the video rendering system and method enable a user to read the script without glancing away from a central or main focal point of the display. In one embodiment, advantageously, the script may be overlaid in a manner such that the script is visible (displayed) to the user (e.g., a subject of the video), and not visible to a recipient of the video stream or, optionally, not rendered as part of the video recording. In one embodiment, a user may select a first option to display the script during playback of a video recording rendered using a script overlay. In one embodiment, the user select a second option to prevent the display of the script during playback of a video recording rendered using a script overlay.

In addition, the system and method according to embodiments of the present disclosure cause the user to direct their line of site in a direction that results in recorded or streamed video. In one embodiment, while reading the script overlay, the rendered video gives the appearance to a viewer that a subject or user of the video is looking straight ahead or directly into the camera. In one embodiment, rendering the video using the script overlay assists the subject is maintaining a desired line of sight to an optimized viewpoint within the field of view of the video capture device (e.g., the camera) in produce the appearance that the user is gazing straight ahead.

Mobile devices (e.g., smartphones, tablets, and laptops) often have a camera with a field of view in the direction of a display screen for capturing images and video of a user of the device. Desktop computers and other computing devices may also have an integrated camera or external camera that faces away from the display screen. These cameras may be referred to as "front facing cameras." In some instances, the front facing camera is positioned (e.g., centered) above the display portion of the device (e.g., when the mobile device is held in a portrait configuration). For example, a front facing camera on a mobile device may be centered above the display screen of the mobile device.

In one embodiment, the front facing camera on a computing device may be used to record images and video of an area in front of the display, also referred to as a field of view) (e.g., a visible area within the camera's field of view, including a user facing or viewing the computing device display). For example, the user may view an output of the camera on the display screen of a device while the video is being rendered (e.g., e.g., transmitted, streamed, fed, and/or recorded). During the rendering of a video, the user may review text (referred to herein as a "script). In one embodiment, the systems and methods disclosed herein display a script overlaying a video rendering (e.g., a live feed or video being recorded). In one embodiment, at least a portion of the content of the script may be displayed at a first position near the camera on the display device. Thus, the user may view the video feed of the camera rendered on the display while concurrently viewing the text (e.g., at least a portion of the script), without interrupting a direct line of sight or focus on the display itself. In one embodiment, the overlay position of the script enables the user to maintain "eye contact" with the camera and a viewer of the video.

In one embodiment, an overlay script may be provided when the image or video capture device of the computing device is in a "rear-facing" mode (e.g., the camera is directed at a field of view including an area located proximate to a rear side (e.g. a side opposite the display) of the computing device. Accordingly, the user can read a script without looking away from the live feed of the camera. In one embodiment, this may enable a user to follow a moving object or to maintain proper positioning of a target of the video while reading from a script, for instance.

Figure 1:
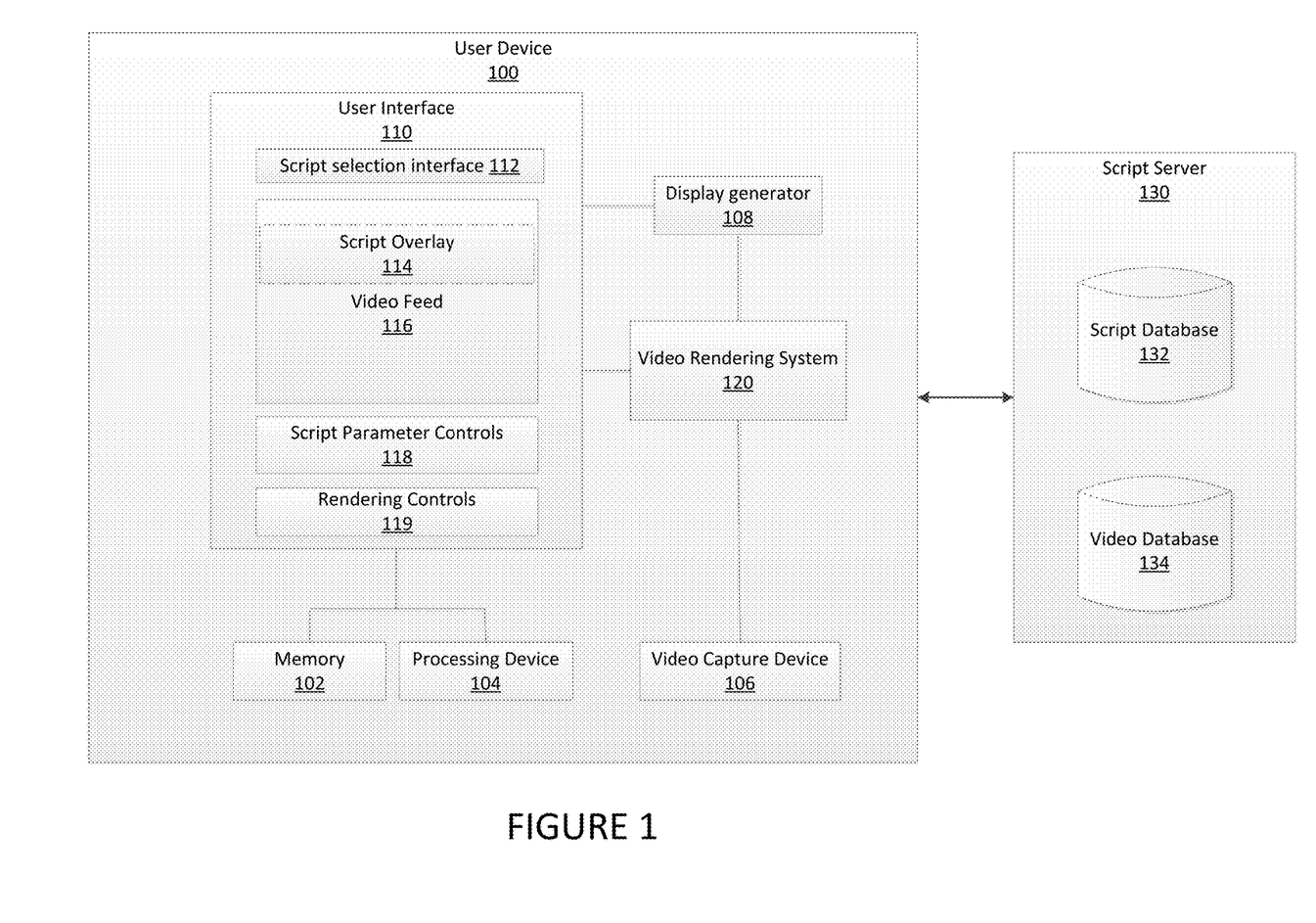
FIG. 1 is a block diagram illustrating a video rendering system, according to an embodiment.

FIG. 1 is a block diagram illustrating an example environment including a video rendering system 120 executing on a user device 100, according to an embodiment. In one embodiment, the video rendering system 120 may be an application stored and executed by the user device 100. In one embodiment, the video rendering system 120 may be a program or client residing on the user device 100 that is communicatively coupled via a network to a corresponding video rendering system executing on a remote computing device (e.g., script server 130). In one embodiment, a suitable network may include, for example, the Internet, intranets, extranets, wide area networks (WANs), local area networks (LANs), wired networks, wireless networks, or other suitable networks, etc., or any combination of two or more such networks.

In one embodiment, the user device 100 includes a memory 102, a processing device 104, a video capture device 106 and a display generator 108. In one embodiment, the processing device 104 may execute one or more programs based on instructions stored in the memory 102 or in another suitable data store. For example, the video rendering system 120 may include a program or set of instructions executable by the processing device 104 of the user device 100. In one embodiment, the video rendering system 120 may record video captured by the video capture device 106. The video capture device 106 may be a camera integrated into the user device 100 or an external camera operatively coupled to the user device 100. For example, video capture device 106 may be a front or rear facing camera of a mobile device or a camera associated with a laptop. While described as a video rendering system 120, the systems disclosed herein may also provide video streaming as an alternative or addition to video recording. For example, the video rendering system 120 may stream the video captured by the video capture device 106 to a remote server or other computing system (e.g., a recipient computing system).

In one embodiment, the user device 100 may be communicatively coupled with the script server 130 via a suitable network. In one embodiment, the script server 130 may be associated with a script database 132 configured to store one or more scripts. In one embodiment, the script server may include a data store (e.g., video database 134) to store one or more recorded videos. In some embodiments, the data stored in script database 132 and the processes performed by the script server 130 may be stored and performed by the user device 100.

In one embodiment, the video rendering system 120 may co-operate with the display generator 108 to generate a display presented via a user interface 110 of the user device 100. In one embodiment, the user interface 110 may a graphical user interface (GUI) configured to display a video feed 116 generated at least in part by the video capture device 106 and a script overlay 114 generated by the video rendering system 120.

In one embodiment, the video rendering system 120 is configured to generate a script selection interface 112, one or more script parameter controls 118, and one or more recording controls 119 for display via the user interface 110. In one embodiment, the script selection interface 112 includes one or more selectable links or icons relating to one or more script-related options. For example the script selection interface 112 may provide access to one or more stored scripts that are available for use by a user. In another example, the script selection interface 112 may include one or more parameters that may be selected to define search criteria for identifying one or more script candidates for display to the user. For example, the one or more script parameters or filters may include a type, a format, a name, a template, a length, a tone, a genre, etc. In one embodiment, the one or more script parameters selected by a user via the script selection interface 112 may be used to identify one or more candidate scripts that may be selected by a user. In one embodiment, the video rendering system 120 may access a set of available scripts stored in the script database 132. In one embodiment, an indication of a script to display may be received through a selection of a link, icon, area, option presented via the script selection interface 112.

In one embodiment, the rendering controls 119 may provide one or more selectable options (e.g., links, buttons, icons, etc.) relating to parameters defining a video to be rendered and displayed via the user interface 110. In one embodiment, the rendering controls 119 may be used to enable a user to select a video feed 116 (e.g., a live feed or a recorded feed captured by the video capture device 106) for display via the user interface 110. In one embodiment, the rendering controls 119 may also include an option to select which of a set of cameras to use for the video feed 116, if multiple video capture devices 106 are available (e.g., a front-facing camera, a rear-facing camera, an external camera, etc.)

In one embodiment, the video rendering system 120 generates one or more script parameter controls 118 including selectable options (e.g., links, buttons, icons, etc.) relating to the control and display of a selected script. For example, the script parameter controls 118 may include options for a speed to scroll the script, a text size of the script, a font type for the script, a text color for the script, or other parameters that impact the display, look, or appearance of the script.

In one embodiment, the video rendering system 120 generates one or more recording controls 119 including selectable options (e.g., links, buttons, icons, etc.) associated with the rendering (e.g., streaming, transmitting, recording, etc.) of the video feed 116. For example, the recording controls 119 may provide controls for starting, stopping, or pausing the recording of the video feed 116, streaming of the video feed 116 (e.g., a streaming rate, bit rate, etc.), a video quality, a file type associated with the recorded video data, or the like.

In one embodiment, the video rendering system 120 is configured to generate a script overlay 114 to display a script in accordance with the selected script parameters via the user interface 110. For example, the script overlay 114 may display the script using text and speed parameters associated with a script (e.g., selected by the user). In some embodiments, the text displayed as part of the script overlay 114 begins to scroll in response to the initiation of a video feed 116 or associated recording by the video rendering system 120. In some embodiments, the user interface 110 may include a user interface element to control scrolling of the text separate from the recording features.

In one embodiment, video data associated with the video feed 116 that is recorded by the video rendering system 120 may be stored locally on the user device 100, stored on a script server 130, or a combination thereof. For example, in some embodiments, the video rendering system 120 may cause the video data to be stored locally on the user device 100 and then uploaded to a video database 134, in response to an instruction or upon completion of the recording. In some embodiments, the video rendering system 120 may stream a recording video to a script server 130 during processing of the video feed 116 for the script server 130 to store in a video database 134.

Figure 2:
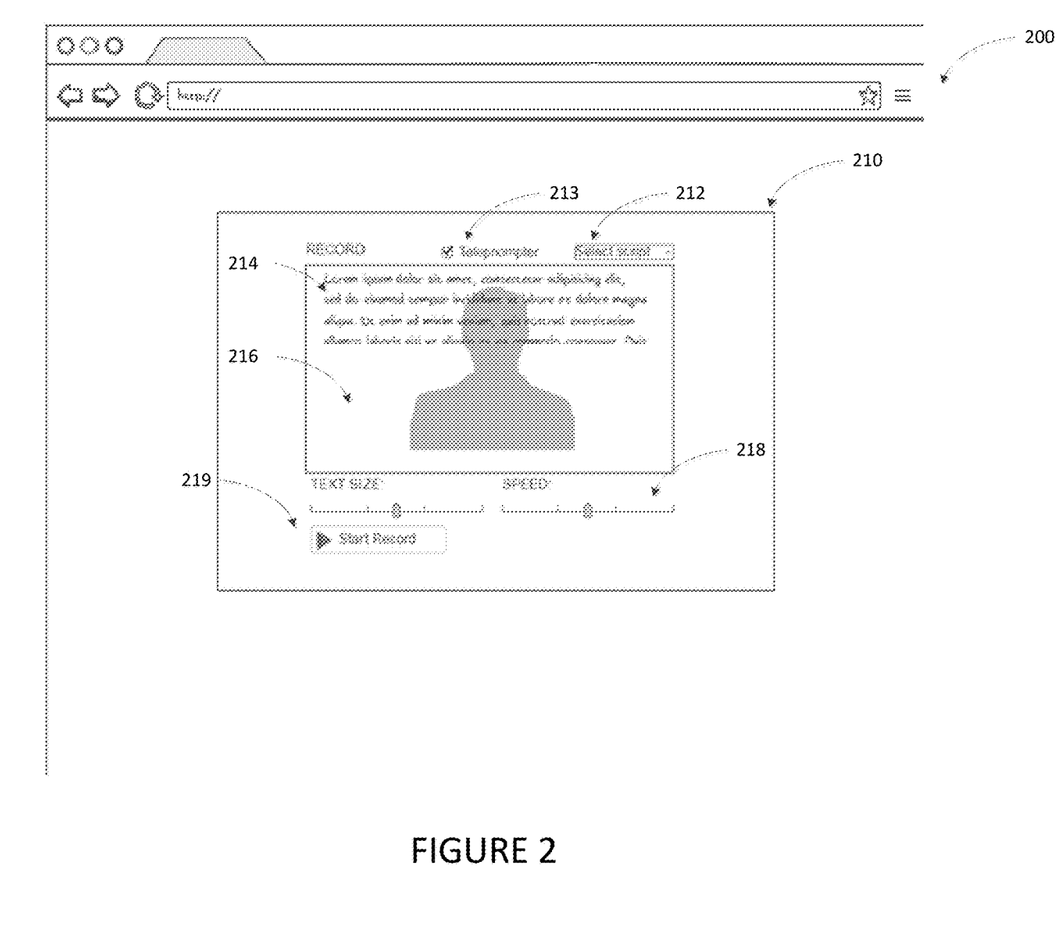
FIG. 2 is an example user interface, according to an embodiment.

FIG. 2 is an example user interface 210, according to an embodiment of the present disclosure. For example, the user interface 210 may be generated by the video rendering system 120 described with reference to FIG. 1. In some embodiments, other user interfaces may include fewer or additional user interface elements than the examples shown in FIG. 2. Additionally, in some embodiments, the displayed elements of the user interface 210 may be arranged differently than the arrangement shown in the example user interface 210 of FIG. 2.

In one embodiment, the user interface 210 may be provided and accessed via a web-based browser 200 (e.g., Microsoft® Internet Explorer browser, Apple® Safari, and the like). In one embodiment, a user interface similar to user interface 210 may be presented as part of an application installed on a user device (e.g., a smartphone) or as part of a standalone application accessible by the user device.

In FIG. 2, the example user interface 210 includes a drop down script selection element 212. The drop down script selection element 212 may display titles or other identifying information associated with one or more available scripts or information that may be used as search criteria to identify one or more scripts that may be edited or deployed. In one embodiment, the user interface 210 also includes a teleprompter selection box 213 configured to provide an interactive element (e.g., a button, an icon, a field, a link, etc.) corresponding to whether to display the video feed only or display the video feed with an overlay of script text. In one embodiment, a slider (or other suitable controller) may be used to control whether to display the script overlay with the video feed. The example user interface 210 may also include script parameter controls 218. For example, the script parameter controls 218 may include one or more options relating to adjusting the speed and text size of the script. The example user interface 210 may also include recording controls 219. For example, as shown in example user interface 210, the recording controls provide a control for when to start recording. In one embodiment, the recording controls 219 may further include an option stop or pause a recording in progress.

In one embodiment, the example user interface 210 also includes a video feed 216 and a script overlay 214. The video feed 216 may be provided from a video capture device (not shown) associated with a user device. The script overlay 214 may be provided as at least partially covering the video feed 116, as shown in FIG. 2. For example, the script overlay 214 may cover only a top portion of the video feed (for example, the top third, quarter, fifth, or another portion of the video feed). Furthermore, as shown in the example user interface 210, the script overlay 214 may be presently in an at least partially transparent font type such that both the text of the script overlay 214 and the video feed 216 imagery "behind" the script overlay 214 are visible.

In one embodiment, a position of the script overlay 214 is arranged relative to a central focal point relative to the image capture device to result in a video rendering wherein a subject of the video is looking straight into the camera or display while reading the script, without needing to divert his or her eyes away from the camera's primary line of sight. For example, the video rendering system 220 may determine a position for the script based on the position of the camera relative to a display screen. For example, different mobile devices may have cameras located in slightly different places. Accordingly, the video rendering system 220 may determine an optimal or customized position, size, scrolling speed, font type, etc. based on the type of computing device being used. For example, the script overlay 214 may be placed higher, lower, or offset from the center to compensate for the position of a particular video capture device 206.

In one embodiment, the video rendering system may also dynamically update the position of the script overlay 214 based on the user's current line of sight. For example, the video rendering system 220 may be configured to determine and analyze a position or gaze of one or more eyes of the subject (e.g., using the image capture device and corresponding eye detection algorithms). In one embodiment, based on the detection of the user's eye parameters (e.g., position, gaze, etc.), the position and other parameters of the script overlay 214 may be adjusted. For example, if the eye position does not appear straight ahead, the position of the script may be changed to compensate. For example, if the eye position appears to be too high, the script overlay may be lowered relative to an initial position or the video feed 216.

Figure 3:
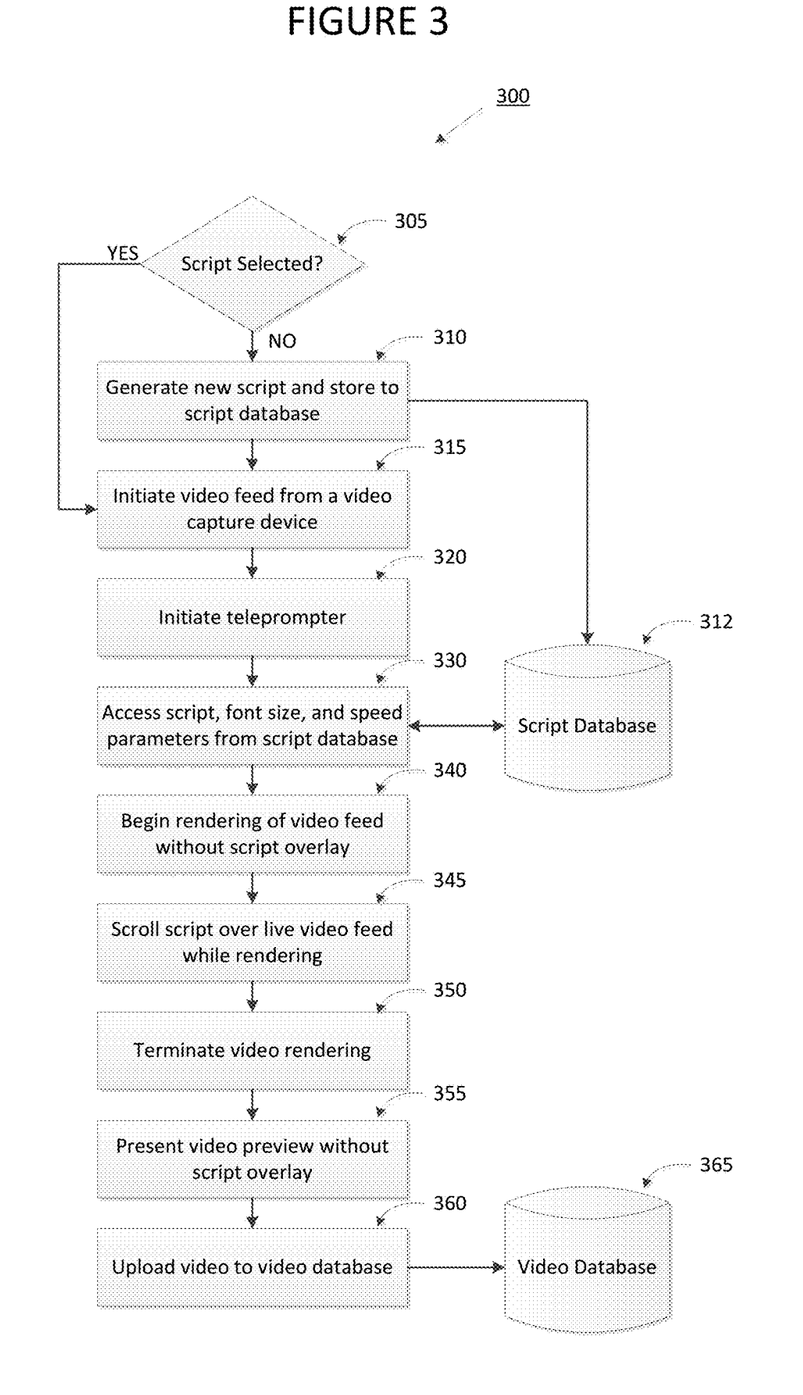
FIG. 3 is a flow chart illustrating an example method for performing video rendering, according to an embodiment.

FIG. 3 is a flow chart depicting an example method 300 for displaying and recording a scripted video feed (e.g., a presentation), according to an embodiment. The method 300 may be performed by a video rendering system (e.g., video rendering system 120 of FIG. 1) executed by a computing device (e.g., user device 100 described with reference to FIG. 1), for example. In an implementation, the example method 300 may be initiated by a user launching or starting the video rendering system via a user device. In block 305, the video rendering system 120 may determine whether a script has been selected. For example, the video rendering system may determine if a script has been identified from a user interface provided by the video rendering system. If a script has been selected, the process continues to block 315, if the script has not been selected, the process continues to block 310.

In block 310, the video rendering system generates a new script and stores the script in a script database 312. For example, the video rendering system may receive a file with a script. In one embodiment, the video rendering system may provide a template script and may receive modifications or additions to the script. In some embodiments, the video rendering system may receive text input and generate a file including the script text. The video rendering system may then store the script file in a script database. For example, the script database 312 may be on a remote server, or may be local to the video rendering system.

In block 315, the video rendering system initiates a video feed from a video capture device. For example, the video capture device may provide a stream of video and audio data that is captured by the video capture device and one or more audio capturing devices (e.g., a microphone). In one embodiment, the stream of video data may be presented as a video feed via a display of a user interface generated by the video rendering system.

In block 320, the video rendering system may initiate a teleprompter on the video feed. For example, the video rendering system may present a first portion of a script overlaying a portion of the video feed. For example, the video rendering system may use alpha-blended graphics to blend the video feed with the script overlay to provide a composite image including the video feed and the script overlay as at least a portion of the display of the user interface of the computing device. In one embodiment, the script may be initialized at a position relative to the camera's field of view such that the script will guide the user to look in a direction such that the user will appear to be looking straight ahead while reading from the script.

In block 330, the video rendering system may access and apply one or more script parameters (e.g., script size, font size, scrolling speed, and other parameters from a script database. In some embodiments, the script parameters may be stored in a different data store than the script text or in a same data store. For example, the script may be stored in one data store accessible by one or more user devices. In one embodiment, script parameters may be associated with a profile corresponding to a user. In addition, in some embodiments, the parameters may be edited on a user interface provided by the video rendering system.

In block 340, the video rendering system causes rendering of the video feed (e.g., displaying, streaming, recording, etc.) For example, the video rendering system may display and stream the video feed, display and record the video stream, or display, stream, and record the video stream. In one embodiment, the video feed may be rendered in block 340 without the added overlay script. In some embodiments, the video rendering system may perform block 340 in response to an interaction with a recording control of a user interface.

In block 345, the video rendering system begins scrolling the script over the live video feed being rendered. For example, the script overlay may be scrolled according to a speed parameter set in the script database (e.g., associated with the script), or by the user. In one embodiment, the video rendering system may continue to perform alpha blending to make a composite image of the live video feed and the script overlay.

In block 350, the video rendering system terminates the video recording. For example, the video rendering system may terminate the displaying, streaming, and/or recording of the video feed based on a timer elapsing, based on the script finishing, or based on an interaction with a user interface indicating an instruction to stop the video recording. In one embodiment, if the video feed is being recorded, the recording may be stopped in response to a completion of the script. For example, a determination may be made that a last line of the script overlay reached a particular position or point on the display (also referred to as a termination point), indicating that the script overlay has scrolled to a point of completion. In response to the determination, the video recorded may be stopped or terminated.

In one embodiment, the video recording may be stopped in response to determining that no audio is detected for a time period that exceeds a threshold amount of time. For example, if the video rendering system detects silence or a lack of audio associated with the reading of the script for greater than a time threshold (e.g., 5 seconds), then a determination may be made that the reading of the script overlay is complete and the recording of the video may be terminated.

In block 355, if the video feed is recorded, the video rendering system may present a preview of the recorded video without the script overlay. For example, the video may be the recorded video including video and audio data captured by the video capture device. In one embodiment, if the video rendering system receives approval for the video preview (e.g., via an indication by the user), the recorded video may be stored in a video data store, in block 360. The video may then be provided back to a user device at another time or transferred to a recipient.

Figure 4:
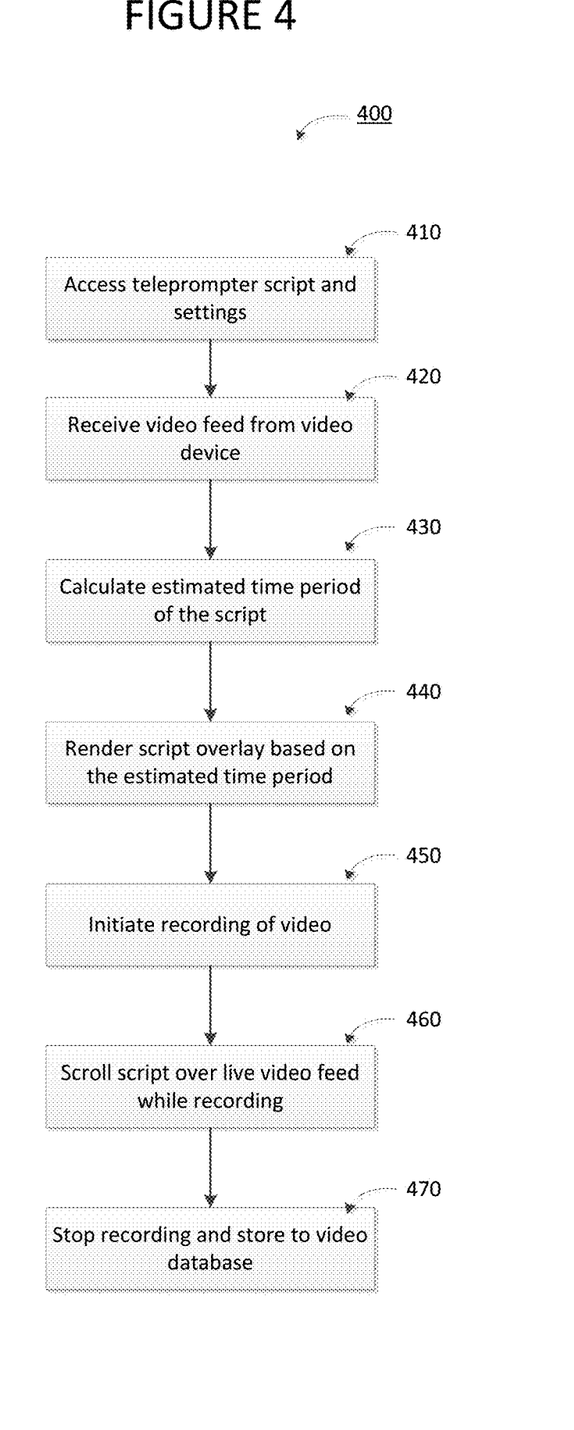
FIG. 4 is a flow chart illustrating an example method for performing video rendering, according to an embodiment.

FIG. 4 is a flow chart depicting an example method 400 for displaying and recording a scripted presentation, according to an embodiment. In one embodiment, the method 400 may be performed by a video rendering system (e.g., video rendering system 120 of FIG. 1) executed by the user device 100 described with reference to FIG. 1, for example. Beginning in block 410, a video rendering system may access a teleprompter script and associated script settings. For example, the script and settings may be accessed from a data store on a server accessible to the video rendering system. In some embodiments, the video rendering system may access the teleprompter script or settings locally or may generate the teleprompter or script settings based on interaction with a user interface.

In block 420, the video rendering system receives a video feed from a video capture device. For example, the video feed may be received from a video capture device on a mobile device, laptop, web camera, or the like. In one embodiment, the video feed may be representative of images captured from a front or rear facing camera, or from another camera.

In block 430, the video rendering system calculates an estimated length of time (also referred to as a time period) of a selected script. For example, the estimated time period may be based on one or more settings associated with the script, such as, for example, a font size, a scrolling rate of the script, a length of the script (e.g., number of words, number of characters, or the like). In some embodiments, the video rendering system may also take into account device features (e.g., a size of the display), display type (e.g., a web browser interface, an application interface, etc.)

In block 440, the video rendering system renders the selected script overlaying the video feed. For example, the selected script may be opaquely or translucently presented over a portion of the video feed. In one embodiment, the displayed portion of the selected script may be limited to an area, such that the underlying video feed is viewable without the overlay. For example, the selected script may be presented as covering an upper portion of the video feed, such that a portion of the video feed is presented more clearly without overlaying script. In one embodiment, the video rendering system may render the script overlay over the video feed using any suitable rendering approach, such as, for example, alpha-blended graphic rendering. In one embodiment, the video rendering system may present the script centered on the video feed or centered on a portion of the video feed that is presented near a camera. Accordingly, the user may appear to be looking into the camera rather than at a prepared speech.

At block 450, the video rendering system initiates functionality of an audio/video recording to begin recording of a video. In one embodiment, during recording, the video stream and script overlay are displayed on a user device. In one embodiment, an indicator may be provided via the user interface to indicate a minimum recording duration of the video. For example, an adjustable slider may be provided that includes a default minimum recording time (e.g., 30 seconds). In this example, a user may interact with the adjustable slider to change or adjust the minimum recording time.

In one embodiment, an indicator may be provided via the user interface to indicate a maximum recording duration of the video. For example, an adjustable slider may be provided that includes a default maximum recording time (e.g., 60 seconds). In this example, a user may interact with the adjustable slider to change or adjust the maximum recording time.

At block 460, the video rendering system may scroll the script over the video feed while recording the video feed. For example, an animation of text may scroll from the low end of a script section of a video feed to a high end of a script section of a video feed. The script overlay may be presented as strings moving up and then hiding out of the script section of the video feed whereas new strings appear moving from the bottom of the section, providing smooth and comfortable reading. The scrolling rate may depend on font size and speed selected from a user interface or stored in a set of parameters for a user or for a script. In some embodiments, a video rendering system may change the speed the script is scrolling during recording. For example, the video rendering system may change the speed based on input from a user interface or other device.

In block 470, the video recording is stopped and a file including the recorded video is stored to a database. The recording may be stopped in response to user input, or automatically based on a completion of the script. In some embodiments, there may be a delay between a script scrolling completion and the recording stopping (e.g., the video recording may be stopped after a predetermined threshold of time (e.g., 5 seconds) after the script overlay feed is complete). The video rendering system may also store the video to a database on a remote server. In some embodiments, the video may be stored in a local data store.

The processes described in FIGS. 3 and 4 may be performed in a different order than is shown in the figures. In addition, in some embodiments, fewer or additional processes may be performed by a video rendering system. Although shown as an ordered set of operations, in some embodiments, some processes may be performed in a different order or may be performed in parallel.

Figure 5:
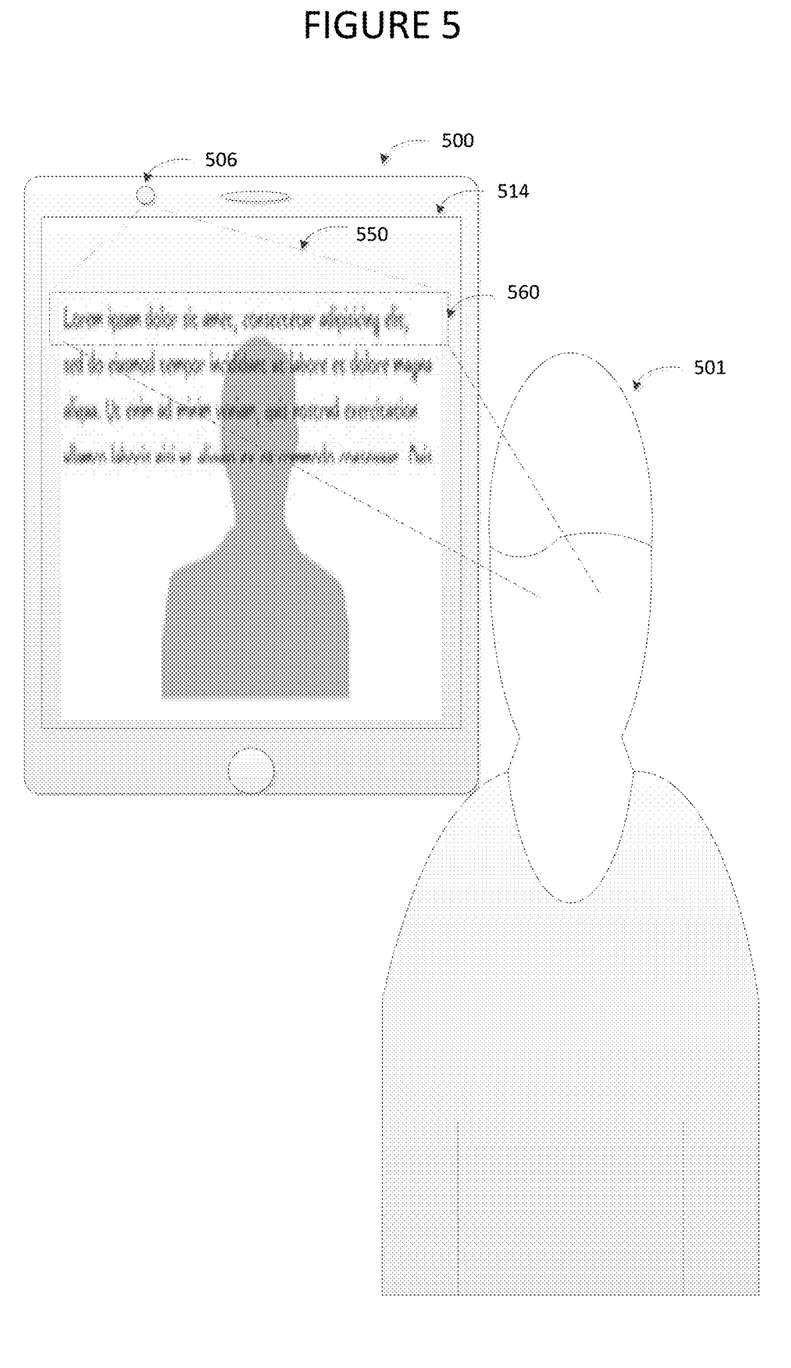
FIG. 5 is an example user interface including a video feed and script overlay corresponding to a user, according to an embodiment.

FIG. 5 illustrates an example implementation of a video rendering system including a user interface 514 of a user device 500 displaying a video feed corresponding to a video capture device 506 (e.g., a camera). As shown, a user 501 is positioned within a field of view of the video capture device 506 (e.g., a front-facing camera of a mobile device). The script overlay is positioned within the user interface (and relative to the video capture device 506) such that the user 501 maintains a line of sight 560 while reading the text of the script overlay. In one embodiment, the line of sight 560 corresponds to a first region 550 of a field of view of the video capture device 506. In one embodiment, when the line of sight 560 of the user 501 is fixed upon the script overlay and aligned with the first region 550 of the field of view of the video capture device, a viewer of the video rendering (e.g., a second user receiving a video stream, a second user viewing a recording of the video, the user 501 viewing a recording of the video) is given a visual perception that the user 501 is looking directly at the viewer (e.g., making eye contact). In one embodiment, the line of sight 560 of the user 501 that is created by reading the text of the script overlay corresponds to the first region 550 of the field of view of the video capture device 506 in such a manner that a resulting video rendering (e.g., a streamed video or a recorded video) provides the visual perception that the user 501 is looking directly into the video capture device 506 (or at a viewer of the video rendering). Advantageously, the video rendering system generates and positions the script overlay at a position of the display to produce the above-described line of sight corresponding to the first region (e.g., a region corresponding to "eye contact" with a viewer of the rendered video) of a field of view of the video capture device.

Figure 6:
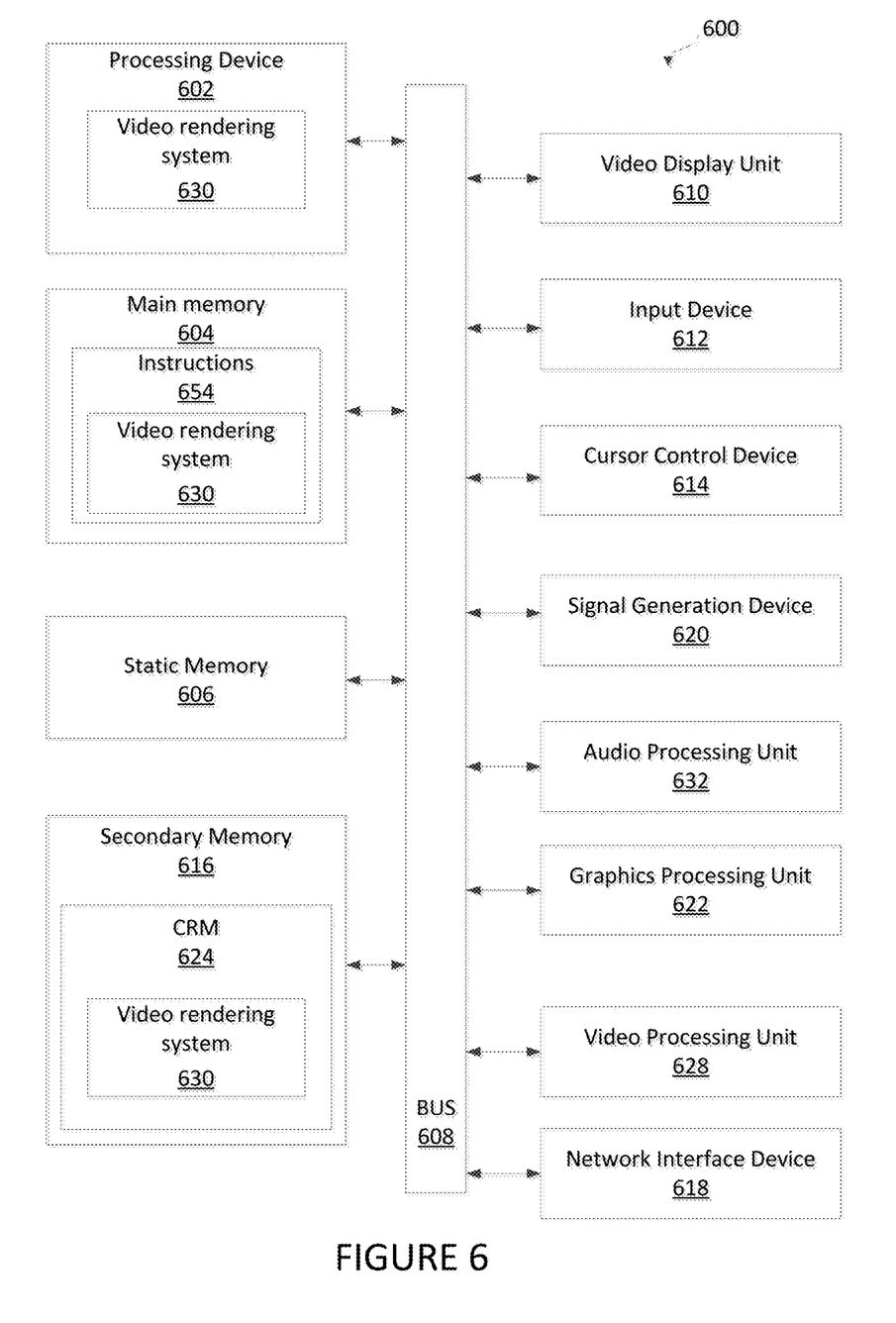
FIG. 6 is a schematic block diagram that provides an example illustration of a computing environment executing instructions relating to rendering video, according to one embodiment.

FIG. 6 depicts an example computer system 600 which can perform any one or more of the methods described herein for recording video with a teleprompter script overlay. In one example, computer system 600 may correspond to user device 100 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like. The computer system 600 may include a graphics processing unit 622, a video processing unit 628, and an audio processing unit 632.

The computer system 600 may further include a network interface device 618. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium (CRM)) 624 on which is stored one or more sets of instructions embodying any one or more of the methodologies or functions described herein (e.g., video rendering system 120). The main memory 604 may also store, completely or partially, instructions 654 embodying any one or more of the methodologies or functions described herein (e.g., video rendering system 120). Furthermore, the processing device 602 may include instructions to implement video rendering system 120 during execution thereof by the computer system 600. The main memory 604 and the processing device 602 may also include machine-readable storage media.

While the computer-readable storage medium 624 is shown in an exemplary implementation to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

The modules, components and other features described herein may be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "recording", "identifying", "generating", "providing", "executing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific exemplary implementations, it will be recognized that the disclosure is not limited to the implementations described, but can be practiced with modification and alteration within the spirit and scope of the disclosure. Accordingly, the specification and drawings are to be regarded in an illustrative sense rather than a restrictive sense. The scope of the disclosure should, therefore, be determined along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

What is claimed is:

1. A method comprising:
identifying, by a processing device, a script comprising text;
generating, via a user interface of a user device, a display comprising a video feed comprising data captured by a video capture device and a script overlay comprising the text of the script at least partially overlaying the video feed, wherein the script overlay is arranged to scroll at a position of the display to produce a visual perception that a user is maintaining a line of sight corresponding to the video capture device when reading at least a portion of the script overlay;
initiating a recording of at least a portion of the video feed; and
terminating the recording of the at least the portion of the video feed in response to a last portion of the script reaching a termination point within the display.

2. The method of claim 1, wherein identifying the script comprises receiving a selection of the script from a plurality of scripts.

3. The method of claim 1, wherein identifying the script comprises retrieving the script from a database storing a plurality of scripts.

4. The method of claim 1, wherein identifying the script comprises receiving a file comprising the script from a user computing device.

5. The method of claim 1, wherein the display further comprises a controller configured to receive one or more indications from the user to control one or more script parameters comprising at least one of a scrolling speed of the text of the script, a font size of the text of the script, a font type of the text of the script, or a color of the text of the script.

6. A system comprising:
a memory to store instructions; and
a processing device operatively coupled to the memory, the processing device to execute the instructions to:
generate a script comprising text based on one or more inputs;
generate a display comprising a video feed comprising data captured by a video capture device and a script overlay comprising the text of the script at least partially overlaying the video feed, wherein the script overlay is arranged to scroll at a position of the display to produce a visual perception that a user is maintaining a line of sight corresponding to the video capture device when reading at least a portion of the script overlay;
initiate a recording of at least a portion of the video feed; and
terminate the recording of the at least the portion of the video feed in response to a last portion of the script reaching a termination point within the display.

7. The system of claim 6, wherein the display further comprises a controller configured to receive one or more indications from the user to control one or more script selection parameters comprising at least one of a selection of the script from a database comprising a plurality of scripts, a script type, a script format, a script name, a script template, a script length, a script tone, or a script genre.

8. The system of claim 6, wherein the display further comprises a controller configured to receive one or more indications from the user to control one or more script parameters comprising at least one of a scrolling speed of the text of the script, a font size of the text of the script, a font type of the text of the script, or a color of the text of the script.

9. The system of claim 6, wherein the display further comprises a controller configured to receive one or more indications from the user to control one or more video rendering parameters comprising at least one of a start recording instruction, a stop recording instruction, a pause recording instruction, a save recording instruction, an instruction to start streaming the video feed to another computing system, an instruction to stop streaming the video feed to another computing system, or an instruction to pause streaming the video feed.

10. A non-transitory computer-readable storage device storing computer-executable instructions that, if executed by a processing device, cause the processing device to:
store, in a database, a script comprising text;
generate a display comprising a video feed comprising data captured by the video capture device and a script overlay comprising the text of the script at least partially overlaying the video feed, wherein the script overlay is arranged to scroll at a position of the display to produce a visual perception that a user is maintaining a line of sight corresponding to the video capture device when reading at least a portion of the script overlay;
initiate a recording of at least a portion of the video feed; and
terminate the recording of the at least the portion of the video feed in response to a last portion of the script reaching a termination point within the display.

11. The non-transitory computer-readable storage device of claim 10, wherein the display further comprises a controller configured to receive one or more indications from the user to control one or more script selection parameters comprising at least one of a selection of the script from a database comprising a plurality of scripts, a script type, a script format, a script name, a script template, a script length, a script tone, or a script genre.

12. The non-transitory computer-readable storage device of claim 10, wherein the display further comprises a controller configured to receive one or more indications from the user to control one or more script parameters comprising at least one of a scrolling speed of the text of the script, a font size of the text of the script, a font type of the text of the script, or a color of the text of the script.

13. The non-transitory computer-readable storage device of claim 10, wherein the display further comprises a controller configured to receive one or more indications from the user to control one or more video rendering parameters comprising at least one of a start recording instruction, a stop recording instruction, a pause recording instruction, a save recording instruction, an instruction to start streaming the video feed to another computing system, an instruction to stop streaming the video feed to another computing system, or an instruction to pause streaming the video feed.

14. The non-transitory computer-readable storage device of claim 10, the processing device to stream the video feed to a computing system via a network.

* * * * *